(12) United States Patent
Tsai et al.

(10) Patent No.: US 6,339,482 B1
(45) Date of Patent: Jan. 15, 2002

(54) CONTROL METHOD FOR POSITIONING MULTIPLE LENS OF SCANNER

(75) Inventors: Jenn-Tsair Tsai; Te-Chih Chang, both of Hsinchu (TW)

(73) Assignee: Mustek System, Inc. (TW)

( * ) Notice: Subject to any disclaimer, the term of this patent is extended or adjusted under 35 U.S.C. 154(b) by 0 days.

(21) Appl. No.: 09/164,423

(22) Filed: Sep. 30, 1998

(51) Int. Cl.$^7$ ................................................ H04N 1/04
(52) U.S. Cl. ..................... 358/474; 250/555; 359/813
(58) Field of Search ................................. 359/813, 822, 359/821; 358/474, 482, 513, 515, 697, 809; 250/555

(56) References Cited

U.S. PATENT DOCUMENTS 5,841,121 A * 11/1998 Koenck ....................... 235/472

* cited by examiner

*Primary Examiner*—Jerome Grant, II
*Assistant Examiner*—Negussie Worku
(74) *Attorney, Agent, or Firm*—Lowe Hauptman Gilman & Berner, LLP

(57) ABSTRACT

The present invention provides a control method for moving and positioning multiple lens of a scanner to their accurate position. The method mainly uses a linear reference image, such as a calibration paper with some marks in the scanning range, taken by a specific lens to a CCD for verifying if the lens is well positioned according to a decision rule. The lens is controlled to move to its correct position by the continuous feedback signals from the CCD, so the accuracy and reliability of the positioning can be kept without being influenced from any worn-out of frequent movements of the mechanism.

19 Claims, 9 Drawing Sheets

CONTROL METHOD FOR POSITIONING MULTIPLE LENS OF SCANNER

BACKGROUND OF THE INVENTION

The present invention relates to a control method of switching multiple lens of a document image scanner, and particularly to a closed-loop control method which ensures the scanned image to be focused correctly by controlling each lens of different magnification positioning accurately to its correct position.

In the current design of image scanners, in addition to the commonly used single lens systems for scanning documents within a specific size, there are further multiple lens systems for scanning various types of documents of different sizes. Some new designs concerning multiple lens system, which will be described hereinafter, are all emphasized on the improvements to the positioning mechanism of lens or to the actuating mechanism of reflector. The objectives of the mechanisms are to ensure all the scanned images from the different size of documents can be precisely transmitted to the charge couple device (CCD) element through the lens or reflector switched or moved to the correct position, and therefore, a good quality of scanning can be achieved.

FIG. 1 is a multiple lens switching mechanism of the prior art. The mechanism utilizes a motor 12 and reduction gears 14 to switch a set of lenses 18 mounted on a sliding rack 16 to some specific positions aligning to an opto-electric module, and thus providing various image resolutions.

FIG. 2 is another prior art scanner with dual-lens mechanism. A lever mechanism 22 moves a dual-lens base 24 sliding on a rail 26 to change the lenses and image resolutions.

FIG. 3 is further a scanner of prior arts with dual-lens and a movable reflector mechanism. The images of two different kinds of documents 34 and 36 are taken by two lenses 38 individually and reflected by a reflector 32 selectively moving into one of the two optical paths for transmitting the image into the opto-electric module.

In summary, the multiple lens systems of prior arts are emphasized not on the control method but on the positioning or moving mechanisms of the lens. In other words, the control methods of prior arts for positioning the lens are generally of mechanical manners. The common methods are using stoppers or position detectors for the lens to stop at their predetermined position after moving. But this "open-loop" control method relies on precise fabrication of mechanical components; otherwise, the mispositioning of the lens will occur. Basically, a mechanical "open-loop" control method cannot ensure a reliable positioning.

SUMMARY OF THE INVENTION

It is therefore a primary object of the present invention to provide a "close-loop" control method for precisely positioning the lens of a multiple lens system of scanner to accurate positions during the switching control.

The present invention provides a control method for positioning multiple lens of a scanner to their accurate position. The method mainly uses a linear reference image, such as a calibration paper with some marks in the linear scanning range, taken by a specific lens to the CCD for deciding if the lens is well positioned. The decision is made by one of the following three methods:

1. Absolute Position Method

Make a mark on a calibration paper for the scanner. Take previously the image position of the mark that is imaged on a certain pixel of the CCD as a standard pixel $N_I$ through a specific lens reaching its correct position. Thereafter, the specific lens is controlled to move toward the correct position and the mark imaged on the pixels of the CCD is continuously monitored as an instant pixel $n_I$ during the switching of the lens. In comparison, if the instant pixel is not the same as the standard pixel, the lens will be kept moving until the lens reaches the correct position.

2. Relative Position Method

Make two marks relative to two reference points on a calibration paper for the scanner. Take previously the image positions of the marks and two reference points that are imaged on four certain pixels of the CCD and record as standard differential values $N_f$ and $N_r$ of the two mark pixels relative to the reference point pixels respectively through a specific lens reaching its correct position. After then, the specific lens is controlled to move toward the correct position and the two differential values $n_f$ and $n_r$ are continuously monitored during the switching of the lens. In comparison, if the values $N_f$, $N_r$ and $n_f$, $n_r$ are not the same respectively, the lens will be kept moving until the lens reaches the correct position.

3. Range Method

Make two marks spaced with a distance L on a calibration paper for the scanner. Take previously the image positions of the marks that are imaged on two certain pixels of the CCD and record as a standard differential value $N_I$ of the two mark pixels through a specific lens reaching the correct position. After then the specific lens is controlled to move toward the correct position and the differential value $n_I$ is continuously monitored during the switching of the lens. In comparison, if the value $N_I$ and $n_I$ are not the same, the lens will be kept moving until the lens reaches the correct position.

As described above, the lens is controlled to move to the correct position by the continuous feedback signals from the CCD, so the accuracy and reliability of the positioning can be kept without being influenced from any worn-out of frequent movements of the mechanism.

The featuresad advantages of the present invention will be described or will become apparent from the following more detail description of preferred embodiments.

DETAILED DESCRIPTION OF PREFERRED EMBODIMENTS

Figure 1:
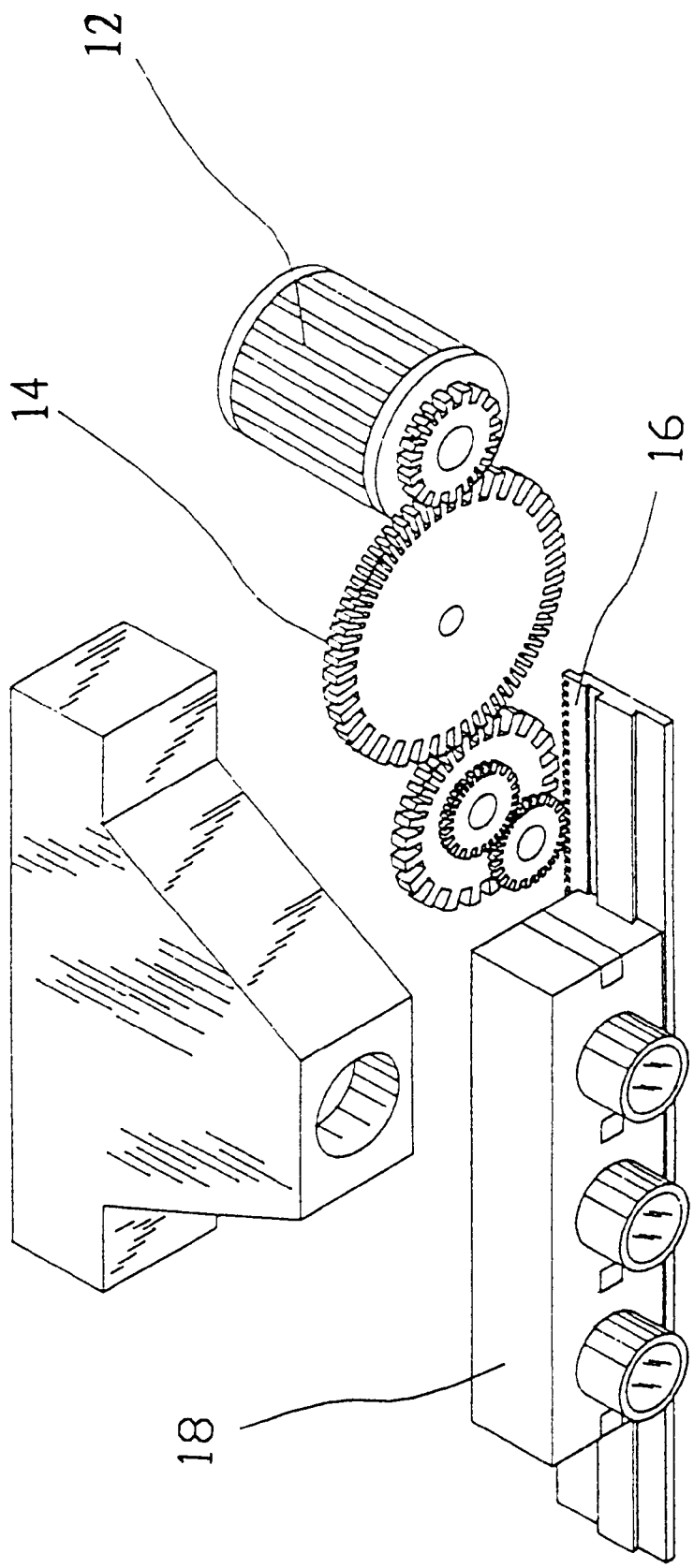
FIG. 1 is a perspective view of a conventional lens switching mechanism for a multiple lens scanner.
Figure 2:
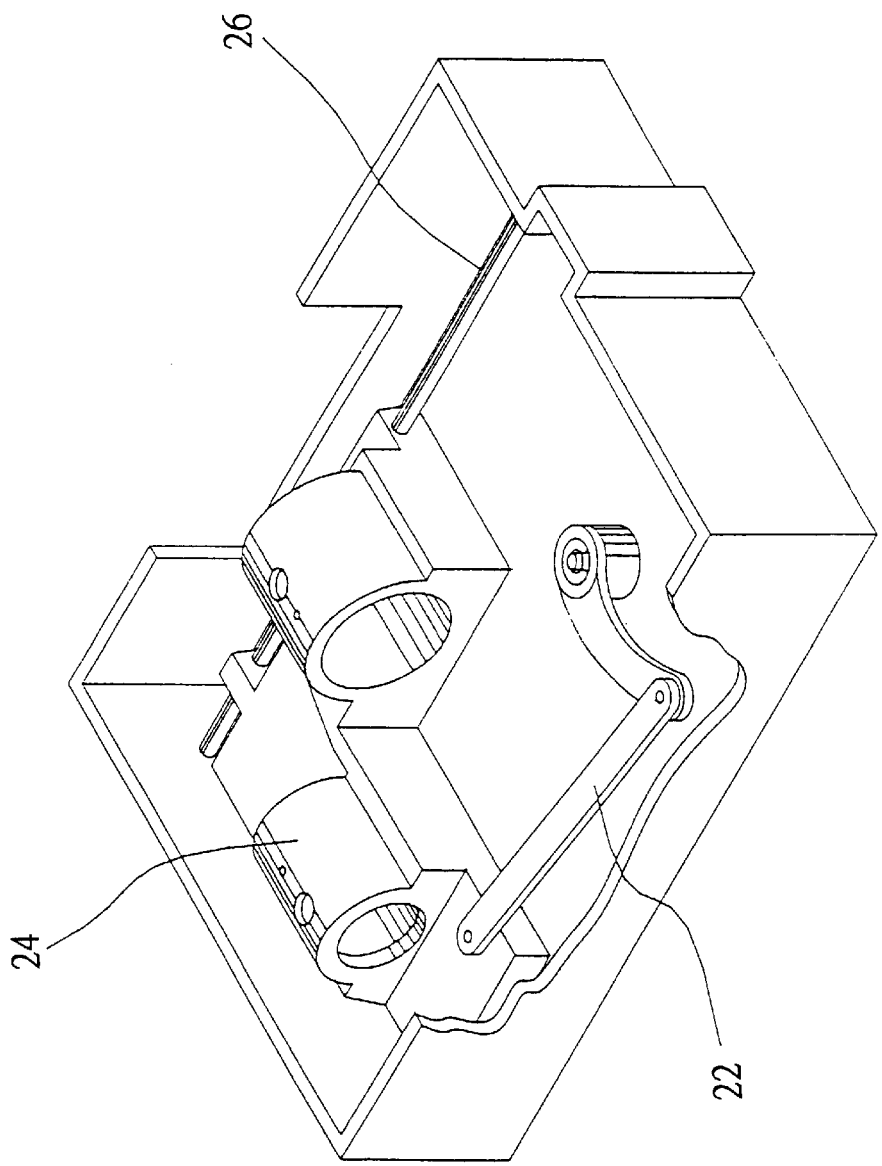
FIG. 2 is another scanner of prior arts with dual-lens mechanism.
Figure 3:
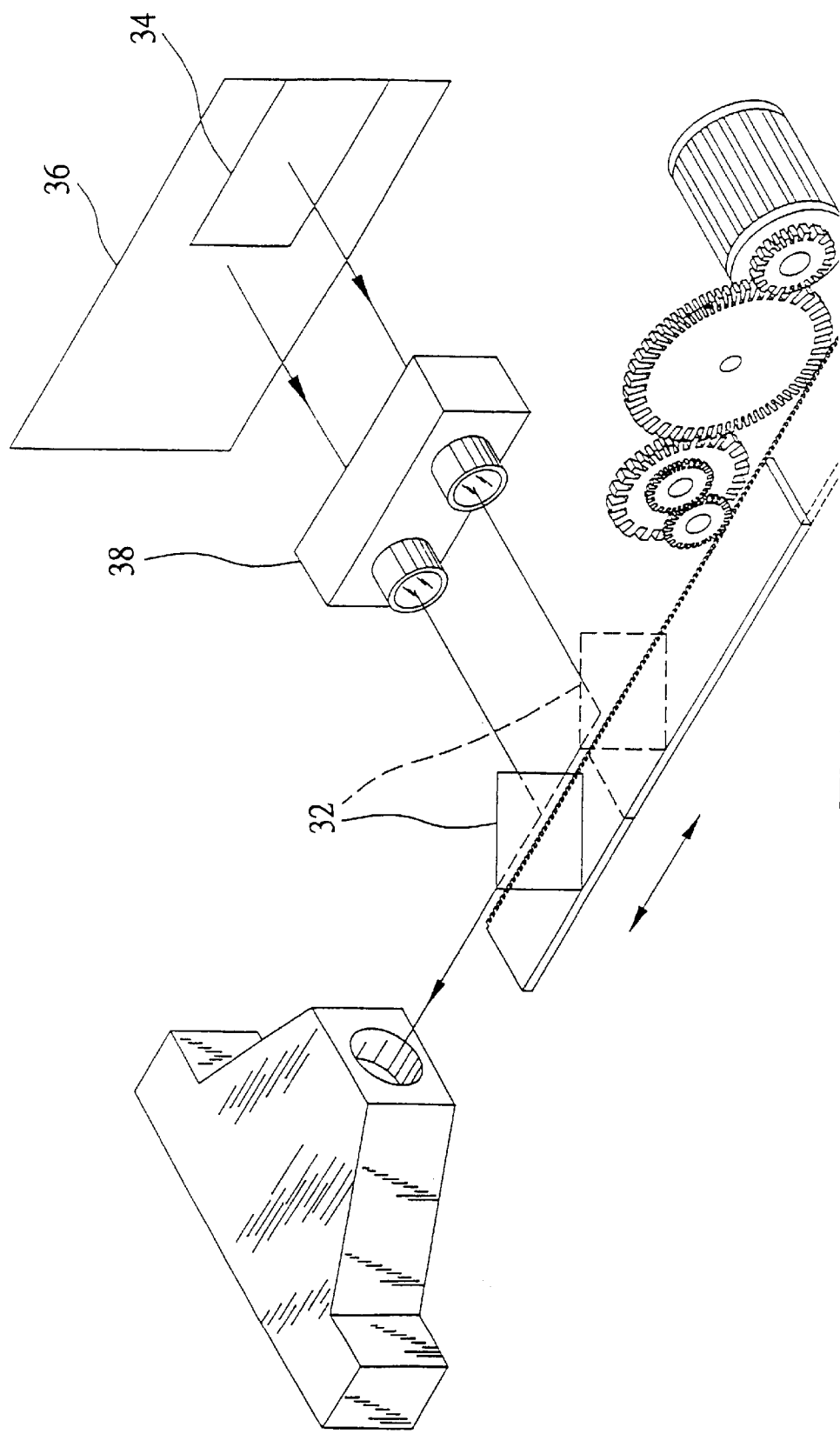
FIG. 3 is further a scanner of prior arts with dual-lens and a movable reflector mechanism.

Some conventional mechanisms for switching the lenses of a multiple lens scanner are described above in accompany with FIGS. 1, 2 and 3.

According to the "close-loop" control method for switching among the multiple lens of the present invention, there are three following preferred embodiments that can be achieved:

First Embodiment

Figure 4:
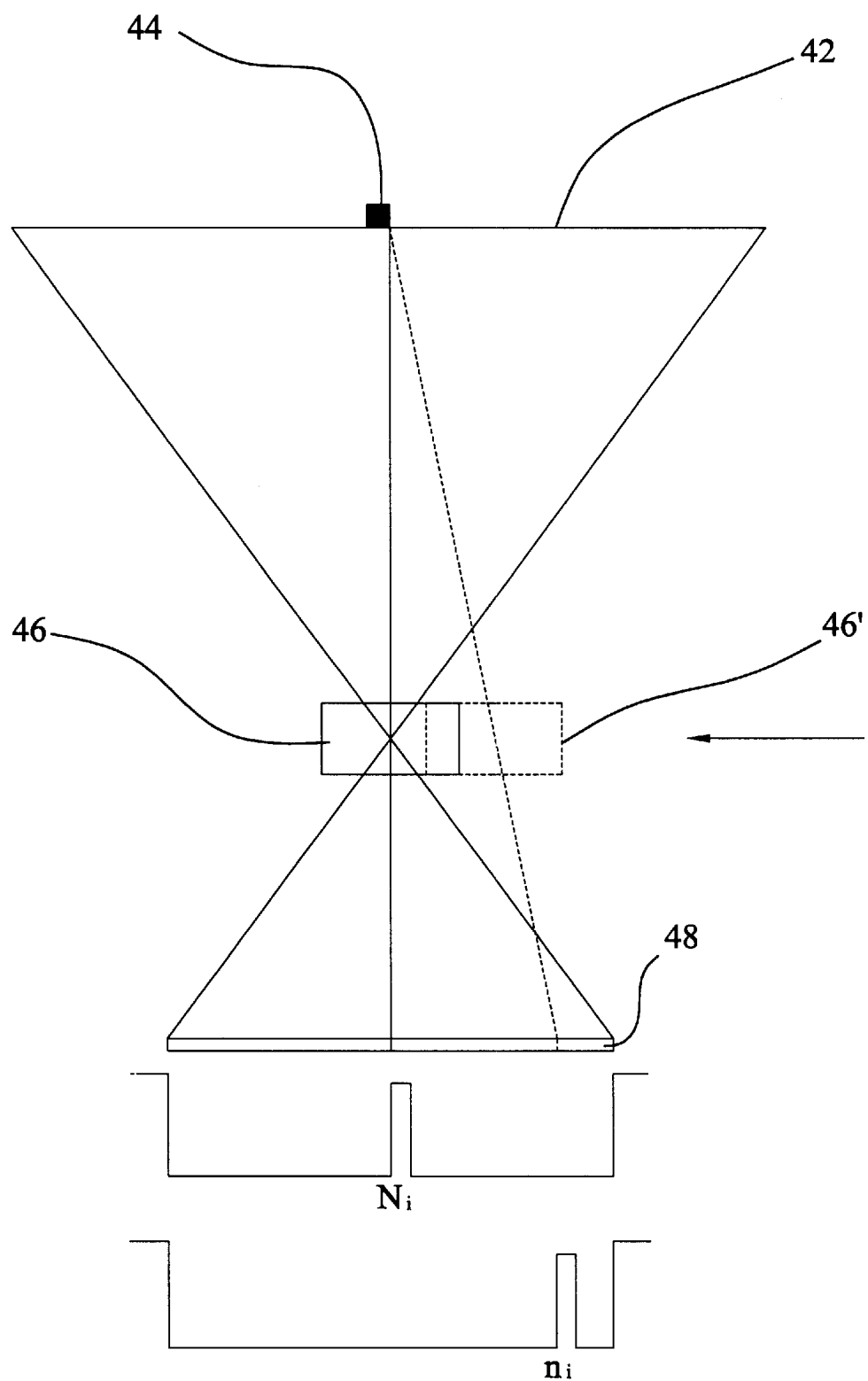
FIG. 4 is a schematic view showing a first embodiment of the present invention which uses a control method of taking the absolute image position on a CCD for a mark on a calibration paper.

In FIG. 4, a schematic view of a first embodiment of the present invention is shown. The method for positioning a specific lens of a multiple lens scanner is taking the absolute image position on a CCD for a mark on a calibration paper.

First, a mark 44 is made on a calibration paper 42, such as a black mark on a white paper or by other identification marking manner. The lens switching mechanism is started from where the lens rests. As shown in the figure, when the position of the mark 44 imaged on a CCD 48 is at a pixel $n_i$ (identified as a waveform) as focused through the lens starting from a right side position 46' (illustrated with dashed lines), the lens will be controlled to move leftward as indicated by the arrow to a correct position 46 where the image of the mark 44 is positioned at a pixel $N_i$ of the CCD 48. Therefore, in a prior calibration process, the position of the mark 44 on the calibration paper 42 which is imaged on the CCD 48 is recorded as a standard pixel when the lens is adjusted to a correct position 46. After that, the standard pixel can be used as an index for positioning the lens. During the switching of the lens, by monitoring the image position of the mark 44 by a pixel on the CCD 48 to check if it is at the standard pixel $N_i$, a precise positioning of the lens can be made. So, as the lens is at the position 46', the mark 44 is imaged at the pixel $n_i$ which is different from the standard pixel $N_i$, i.e. $n_i > N_i$. The lens is then controlled by a control unit (not shown) to move in a direction toward the correct position 46 for minimizing the difference; otherwise, if the lens is at another position where $n_i < N_i$, the lens is then controlled to move in another direction toward the correct position 46 also for minimizing the difference. The movement control continues and the lens moves until the difference is reduced to an acceptable range, i.e. $|n_i - N_i| < n_\square$, in which the value $n_\square$ is an acceptable tolerance of error. Then, the lens stops at the correct position 46.

Figure 5:
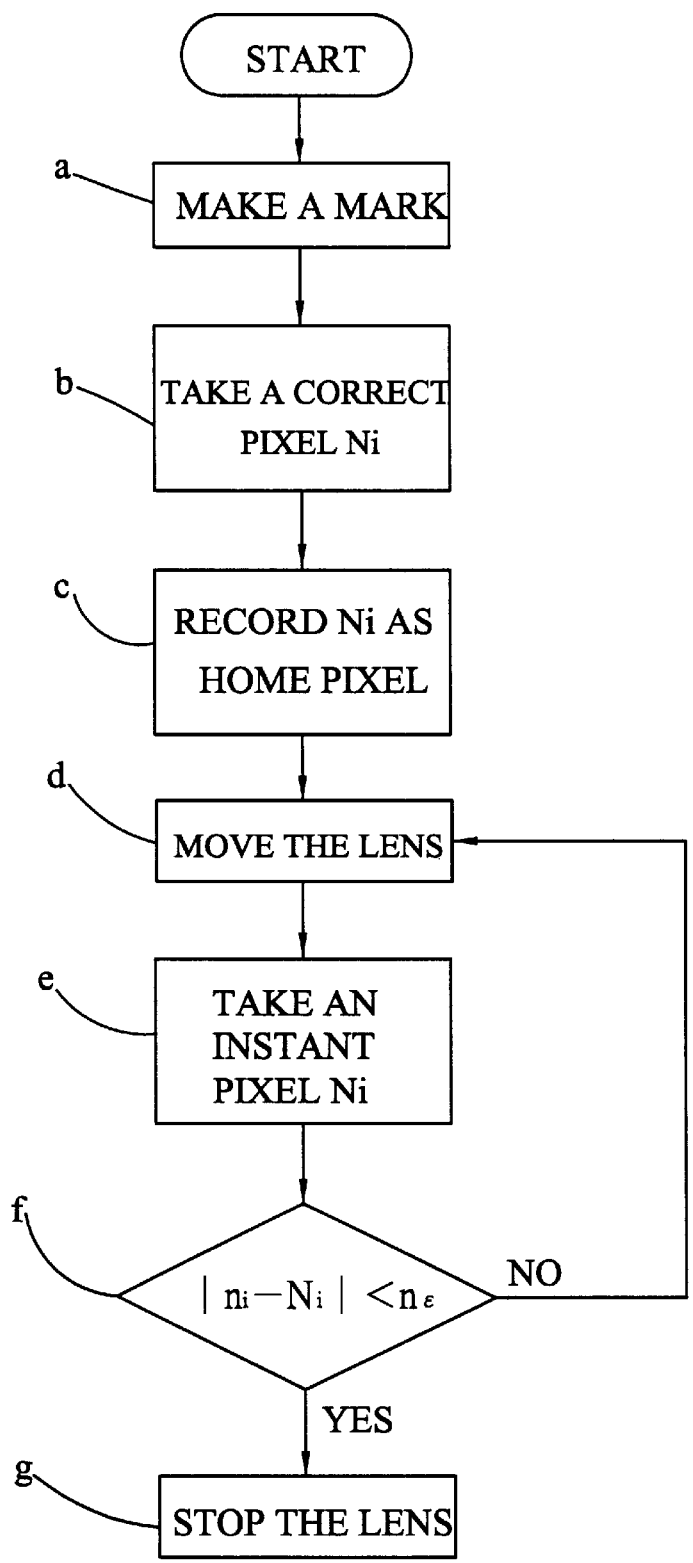
FIG. 5 is a flow chart of the control method of FIG. 4.

Further referring to FIG. 5, a flow chart illustrates the steps of the method described in FIG. 4 for calibration and movement control of a lens in a multiple lens scanner. These steps includes:

a) Making a mark on a linear scanning range, such as a black mark made on the center of a white calibration paper of an A4 sized scanning range;

b) Taking a pixel position of a CCD, such as the number $N_i$ pixel on the CCD, on which the mark is imaged through a correctly positioned lens;

c) Recording the number $N_i$ pixel as a standard pixel; and then, in a lens movement control, d) Moving the lens located between the mark and the CCD toward the correct position;

e) Taking an instant pixel position of the CCD, for example, tie number $n_i$ pixel on the CCD, on which the mark is imaged through the lens that moves to a certain position;

f) Deciding if the instant pixel is the same of or close enough to the standard pixel, for example, if $|n_i - N_i| < n_\square$, in which the value $n_\square$ is an acceptable tolerance of error, and if the answer is no, the procedure returns to the step d; otherwise, it continues to the following step; and g) Stopping the lens at the correct position.

Second Embodiment

Figure 6:
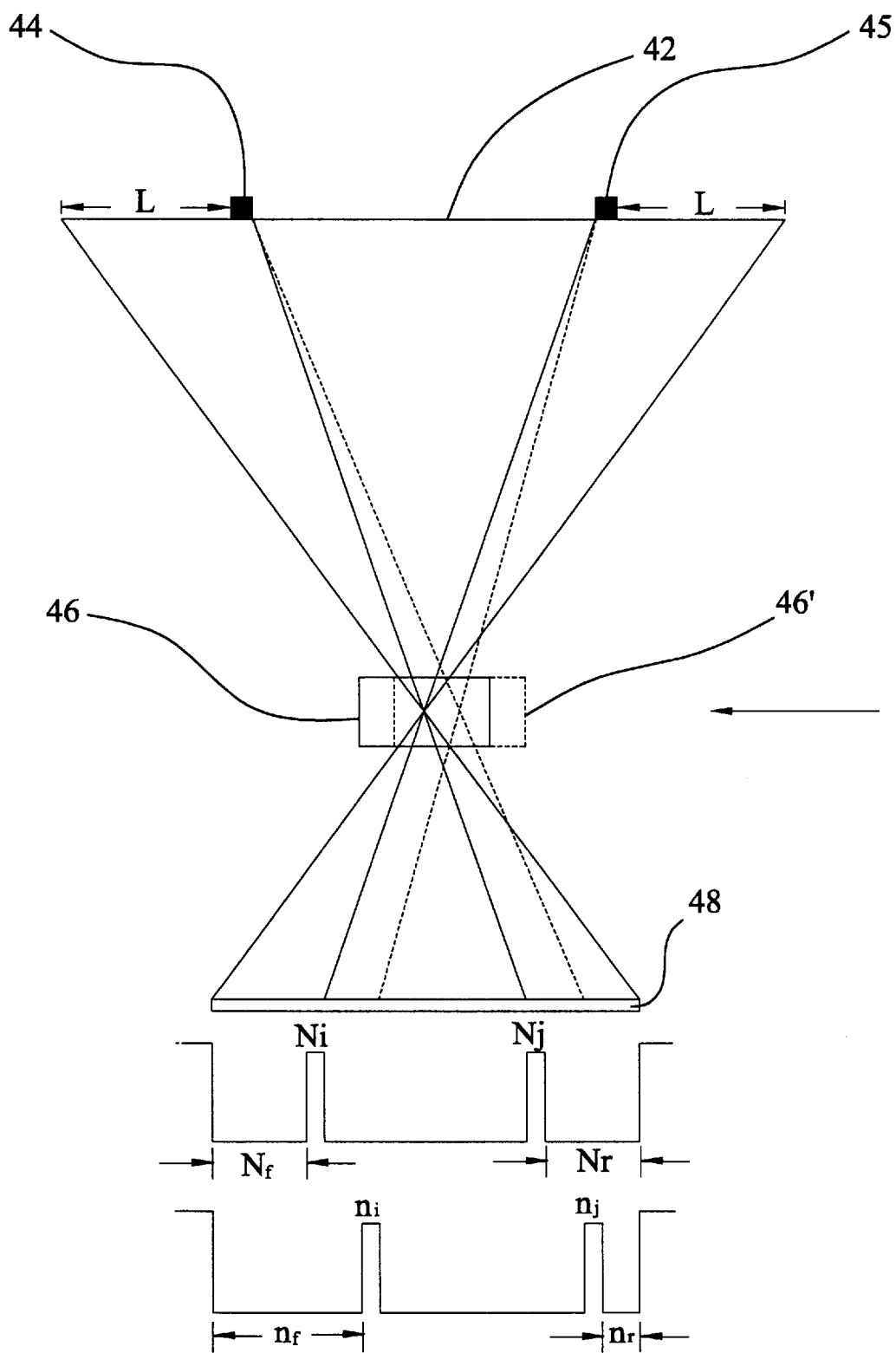
FIG. 6 is a schematic view showing a second embodiment of the present invention which uses a control method of taking the relative image positions on a CCD for two marks on a calibration paper.

In FIG. 6, a schematic view of a second embodiment of the present invention is shown. The method for positioning a specific lens of a multiple lens scanner is taking the relative image positions on a CCD for two marks on a calibration media.

First, two marks 44 and 45 are made on a calibration paper 42, such as two black marks on a white paper or by other identification marking manner. The lens switching is started from where the lens rests. As shown in the figure, when the position of the marks 44 and 45 imaged on a CCD 48 are at two image pixels $n_i$ and $n_j$ (identified as a waveform) as focused through the lens starting from a right side position 46' (illustrated with dashed lines), the lens will be controlled to move leftward as indicated by the arrow to a correct position 46 where the images of the marks 44 and 45 are positioned at two correct pixels $N_i$ and $N_j$ of CCD 48. Therefore, in a prior calibration process, the relative position of the correct pixels $N_i$ and $N_j$ relative to two reference pixels, such as the first pixel and the last pixel of the CCD 48, are recorded as two standard differential values $N_f$ and $N_r$ for positioning the lens. The value $N_f$ represents the differential value of the pixels $N_i$ to the first pixel and the value $N_r$ represents the differential value of the pixels $N_j$ to the last pixel. The values $N_f$ and $N_r$ have a specific relationship, for example, by arranging the two marks 44 and 45 with equal distances L to two edges of the paper 42, and $N_f$ is equal to $N_r$ when the lens is at the correct position 46. After then, the standard differential value $N_f$ and $N_r$ can be used as indexes for positioning the lens. During the switching of the lens, by monitoring the image positions of the marks 44 and 45 by the pixels $n_i$ and $n_j$ on the CCD 48 and calculating the differential values $n_f$ and $n_r$ (relative to the first and the last pixel respectively) to check if they are equal to $N_f$ and $N_r$ respectively, a precise positioning of the lens can be made. So, as the lens is at the position 46', the marks 44 and 45 are imaged at the pixels $n_i$ and $n_j$ and with unequal differential values $n_f$ and $n_r$, i.e. $n_f > n_r$, the lens is then controlled by a control unit (not shown) to move in a direction toward the correct position 46 for equalizing the differential values $n_f$ and $n_r$; otherwise, if the lens is at another position where $n_f < n_r$, the lens is then controlled to move in another direction toward the correct position 46 also for equalizing the differential values $n_f$ and $n_r$. The movement control continues and the lens moves until the difference is reduced to an acceptable range, i.e. $|n_f - n_r| < n_\square$, in which the value $n_\square$ is an acceptable tolerance of error. Then, the lens stops at the correct position 46.

Figure 7:
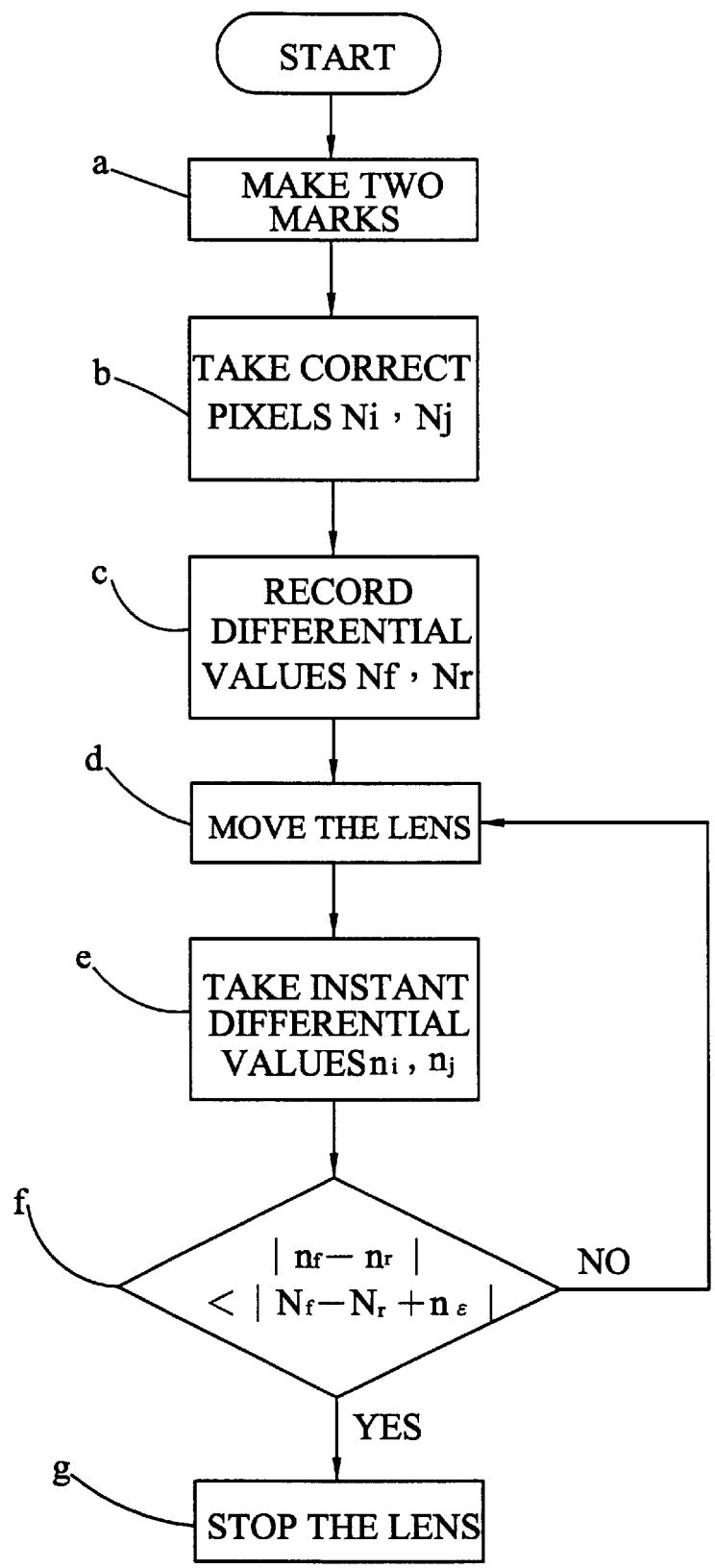
FIG. 7 is a flow chart of the control method of FIG. 6.

Further referring to FIG. 7, a flow chart illustrates the steps of the method described in FIG. 6 for calibration and movement control of a lens in a multiple lens scanner. The steps includes:

a) Making a first and a second marks relative to a first and a second reference points on a linear scanning range respectively, such as two black marks made on a white calibration paper of the A4 sized scanning range with equal distances L from two sides thereof;

b) Taking the pixels of a CCD on which the first and second marks and the first and second reference points are imaged through a correctly positioned lens, for example, the number $N_i$ pixel of the first mark and the number $N_j$ pixel of the second mark on a CCD;

c) Recording a first standard differential value between the pixels of the first mark and first reference point, and a second standard differential value between the pixels of the second mark and the second reference point, for example, the first standard differential value $N_f$ taken from the pixel $N_i$ and the first pixel on the CCD, the second standard differential value $N_r$ taken from the pixel $N_j$ and the last pixel on the CCD, and the two values $N_f$ and $N_r$ are arranged to be equal;

d) Moving the lens located between the first and second marks and the CCD toward the correct position;

e) Taking a first and a second instant pixels of the CCD on which the first and second marks are imaged through the lens that moves to a certain position, for example, a number $n_i$ and a number $n_j$ pixels on a CCD, and taking a first and a second instant differential values between the first and second instant pixels and the first and second reference pixels of the CCD respectively, for example, a first instant differential value $n_f$ taken from the first instant pixel $n_i$ and the first pixel on the CCD, and a second differential value $n_r$ taken from the second instant pixel $n_j$ and the last pixel on the CCD;

f) Deciding if the first and second instant differential values are the same of or close enough to the first and second standard differential values, for example, if $|n_f-n_r|<|N_f-N_r+n_\square|$, in which the value $n_\square$ is an acceptable tolerance of error, if the answer is no, the procedure returns to the step d; otherwise, it continues to the following step; and g) Stopping the lens at the correct position.

Third Embodiment

Figure 8:
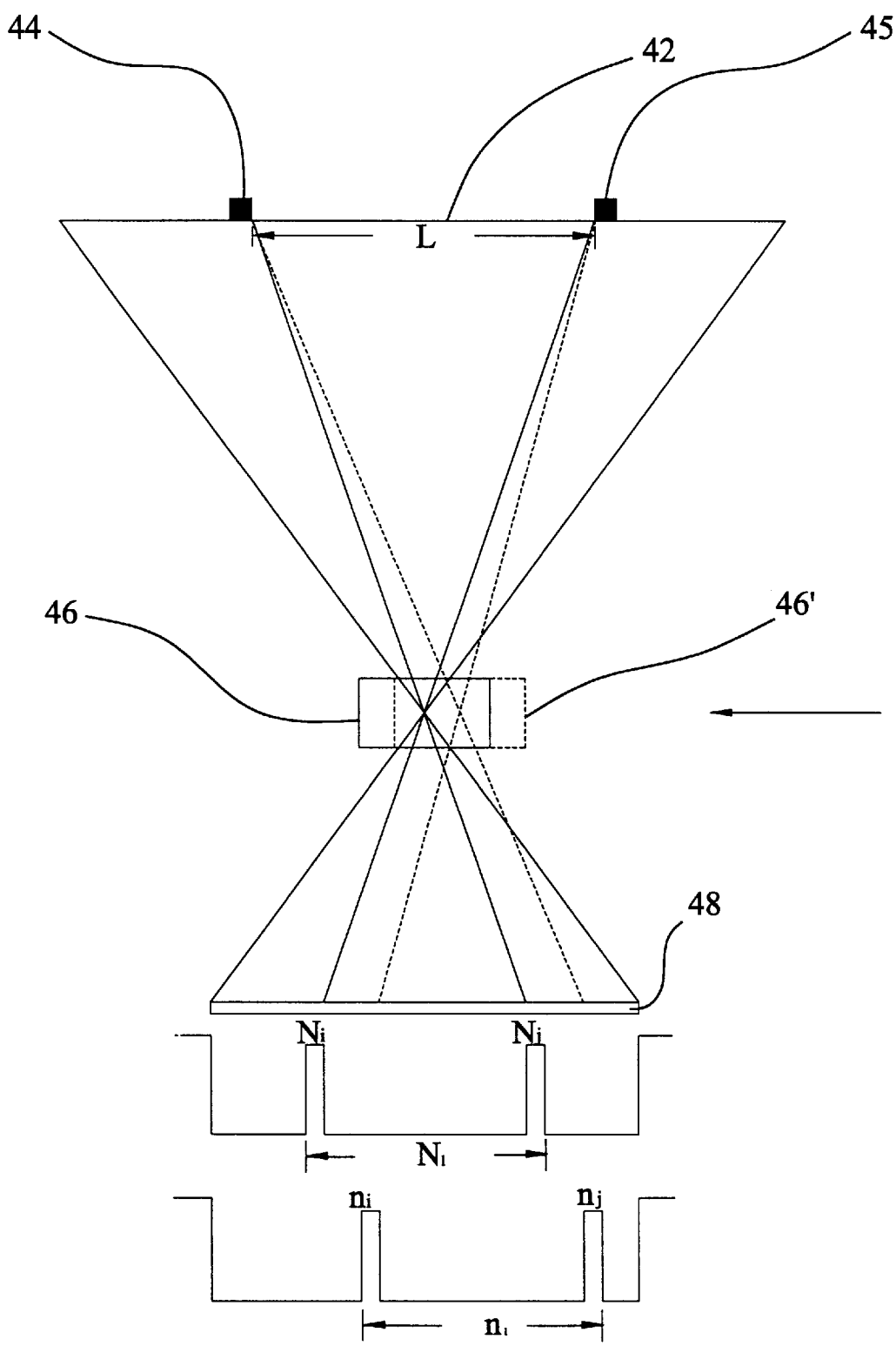
FIG. 8 is a schematic view showing a third embodiment of the present invention which uses a control method of taking the image position range on a CCD for two marks on a calibration paper.

In FIG. 8, a schematic view of a third embodiment of the present invention is shown. The method for positioning a specific lens of a multiple lens scanner is taking the image range on a CCD for two marks on a calibration paper.

First, two marks 44 and 45 are made on a calibration paper 42, such as two black marks on a white paper or by other identification marking manner. The two marks 44 and 45 locate apart with a distance L. In a prior calibration process, when the lens is at a correct position 46 as FIG. 8 shows, the images of the marks 44 and 45 are imaged on two correct pixels $N_i$ and $N_j$ (identified as waveforms) of a CCD 48, the standard differential value $N_l$ between the two pixels are recorded as an index for positioning the lens. After then, in a movement control process, the lens switching is started from where the lens rests. For example, as shown in the figure, when the position of the marks 44 and 45 imaged on the CCD 48 are at two instant pixels $n_i$ and $n_j$ when the lens is at a right side position 46' (illustrated with dashed lines). The instant differential value $n_l$ between the instant pixels $n_i$ and $n_j$ will be smaller than the standard differential value $N_l$ because the biased angle. By monitoring the instant pixels $n_i$ and $n_j$ on the CCD 48 and calculating the instant differential value $n_l$ to check if it is equal to the standard differential value $N_l$, the lens is then controlled by an unshown control unit to move in a direction as shown by the arrow toward the correct position 46 for approaching the differential value $n_l$ to the standard differential value $N_l$. The movement control continues and the lens moves until the difference is reduced to an acceptable range, i.e. $|N_l-n_l|<n_\square$, in which $n_\square$ is an acceptable tolerance. Then, the lens stops at the correct position 46.

Figure 9:
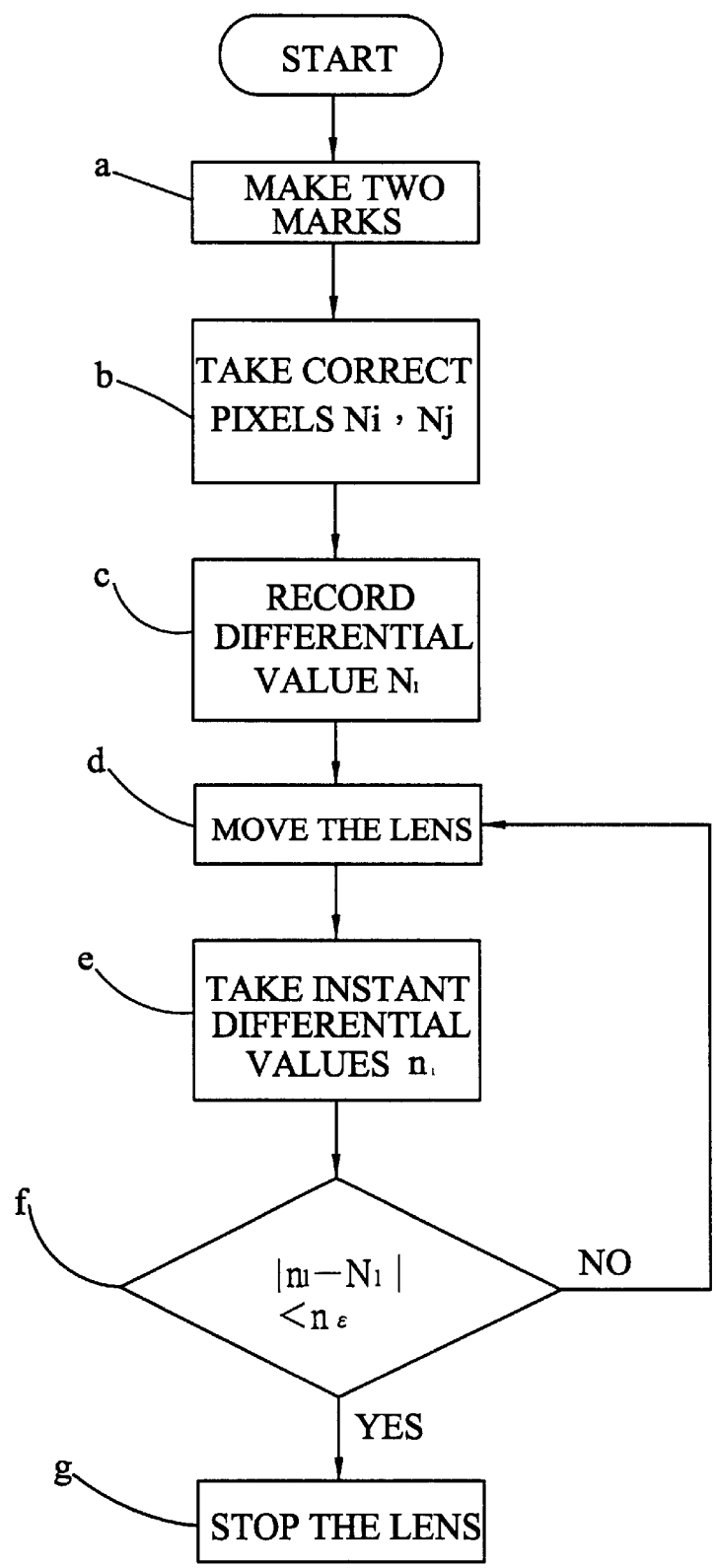
FIG. 9 is a flowchart of the control method of FIG. 8.

Further referring to FIG. 9, a flow chart illustrates the steps of the method described in FIG. 8 for calibration and movement control of a lens in a multiple lens scanner. The steps includes:

a) Making a first and a second marks within a linear scanning range of a calibration paper, such as two black marks made on the a white calibration paper of an A4 sized scanning range with a distance L apart;

b) Taking a first and a second correct pixels of a CCD on which the marks are imaged through a correctly positioned lens, for example, a number $N_i$ and a number $N_j$ pixels on a CCD;

c) Recording a standard differential value between the first correct pixel and the second correct pixel of the CCD, for example, a standard differential value $N_l$ taken from the first correct pixel $N_i$ and the second correct pixel $N_j$;

d) Moving the lens located between the first and second marks and the CCD toward the correct pixel position;

e) Taking an instant differential value from a first and a second instant pixels of the CCD on which the first and second marks are imaged through the lens that moves to a certain position, for example, an instant differential value $n_l$ taken from a first instant pixel $n_i$ and a second instant pixel $n_j$;

f) Deciding if the instant differential value is the same of or close enough to the standard differential value, for example, if $|n_l-N_l|<_\square$, in which the value $n_\square$ is an acceptable tolerance of error, if the answer is no, the procedure returns to step d; otherwise, it continues to the following step; and g) Stopping the lens at the correct position.

Although the invention has been described in connection with preferred embodiments, it will be understood by those skilled in the art that various changes may be made without departing from its scope.

What is claimed is:

1. A method of positioning a lens in a multiple lens scanner, comprising the steps of:

a) setting a mark on a linear scanning range;

b) scanning said linear scanning range through a lens which is correctly positioned in a scanning position, wherein said mark is scanned into a first scanned pixel on a CCD;

c) recording the position of said first scanned pixel as a standard pixel position;

d) moving said lens while said lens is not correctly positioned;

e) scanning said linear scanning range through said lens wherein said mark is scanned into a second scanned pixel on said CCD;

f) deciding whether said second scanned pixel is closed to said first scanned pixel as well as the position of said standard pixel position, if not, moving said lens and returning to step e; and g) stopping the movement of said lens when said second scanned pixel matches said first scanned pixel.

2. A method for positioning lens in a multiple lens scanner according to claim 1, wherein said standard pixel is the number $N_i$ pixel, said second pixel is the number $n_i$ pixel on said CCD and said decision in the step f is made by an equation of $|n_f-N_i|<n$, in which n is an acceptable tolerance of error.

3. A method for positioning lens in a multiple lens scanner according to claim 1, wherein said mark is made on a calibration paper.

4. A method for positioning lens in a multiple lens scanner according to claim 3, wherein said mark is made in the center position of said calibration paper.

5. A method for positioning lens in a multiple lens scanner according to claim 3, wherein said mark has a color distinctive to the color of said calibration paper.

6. A method for positioning lens in a multiple lens scanner according to claim 5, wherein said mark is a black area made on a white calibration paper.

7. A method for positioning lens in a multiple lens scanner, comprising:
   a) Making a first and second marks respectively relative to a first and second reference points within a linear scanning range;
   b) Taking a first correct pixel, a second correct pixel, a first reference pixel and a second reference pixel of a CCD on which said first and second marks and said first and second reference points are imaged through a lens which is correctly positioned;
   c) Recording a first standard differential value between said first correct pixel and said first reference pixel, and a second standard differential value from between said second correct pixel and said second reference pixel;
   d) Moving said lens located between said first and second marks and said CCD toward a correct position;
   e) Taking a first and a second instant pixels of said CCD on which said first and second marks are imaged through said lens that moves to a certain position, and taking a first and a second instant differential values between said first and second instant pixels and said first and second reference pixels of said CCD respectively;
   f) Deciding if said first and said second instant differential values are approaching to said first and second standard differential values respectively, if not, return to the step d; and
   g) Stopping the movement of said lens.

8. A method for positioning lens in a multiple lens scanner according to claim 7, wherein said first and second standard differential values are the value $N_f$ and $N_r$, said first and second instant differential values are the value $n_f$ and a value $n_r$, and said decision verification in the step f is made by an equation of $|n_f-n_r|<|N_f-N_r+n_\square|$, in which the value $n_\square$ is an acceptable tolerance of error.

9. A method for positioning lens in a multiple lens scanner according to claim 8, wherein said first and second standard differential values $N_f$ and $N_r$ are equal.

10. A method for positioning lens in a multiple lens scanner according to claim 7, wherein said first and second marks are made on a calibration paper.

11. A method for positioning lens in a multiple lens scanner according to claim 10, wherein said first and second reference points are at two end-on points of said calibration paper.

12. A method for positioning lens in a multiple lens scanner according to claim 10, wherein said marks have a color distinctive to the color of said calibration paper.

13. A method for positioning lens in a multiple lens scanner according to claim 12, wherein said marks are black areas made on a white calibration paper.

14. A method for positioning lens in a multiple lens scanner, comprising:
   (a) Making first and second marks within a linear scanning range;
   (b) Taking first and second correct pixels of a CCD on which said first and second marks are imaged through a lens which is correctly positioned;
   (c) Recording a standard differential value between said first correct pixel and said second correct pixel of said CCD;
   (d) Moving said lens located between said first and second marks and said CCD toward a correct position;
   (e) Taking an instant differential value between first and second instant pixels of said CCD on which said first and second marks are imaged through said lens that moves to a certain position;
   (f) Deciding if said instant differential value is approaching to said standard differential value, if not, return to the step d; and
   (g) Stopping the movement of said lens.

15. A method for positioning lens in a multiple lens scanner according to claim 14, wherein said standard differential value is the value $N_I$, said instant differential value is the value $n_I$ and said decision in the step f is made by an equation of $|n_I-N_I|<n_\square$, in which the value $n_\square$ is an acceptable tolerance of error.

16. A method for positioning lens in a multiple lens scanner according to claim 14, wherein said first and second marks are made on a calibration paper.

17. A method for positioning lens in a multiple lens scanner according to claim 16, wherein said first and second marks are at the two end-on point of said calibration paper.

18. A method for positioning lens in a multiple lens scanner according to claim 16, wherein said marks have a color distinctive to the color of said calibration paper.

19. A method for positioning lens in a multiple lens scanner according to claim 18 wherein said marks are black areas made on a white calibration paper.

* * * * *